United States Patent
Woolley et al.

(10) Patent No.: US 9,643,450 B2
(45) Date of Patent: May 9, 2017

(54) WHEELS

(75) Inventors: Richard Woolley, Coventry (GB);
Oliver Legrice, Coventry (GB); Ian Sellars, Coventry (GB)

(73) Assignee: Jaguar Land Rover Limited (GB)

( * ) Notice: Subject to any disclaimer, the term of this patent is extended or adjusted under 35 U.S.C. 154(b) by 118 days.

(21) Appl. No.: 14/343,599

(22) PCT Filed: Sep. 7, 2012

(86) PCT No.: PCT/EP2012/067542
§ 371 (c)(1),
(2), (4) Date: Mar. 12, 2014

(87) PCT Pub. No.: WO2013/034711
PCT Pub. Date: Mar. 14, 2013

(65) Prior Publication Data
US 2014/0197674 A1    Jul. 17, 2014

(30) Foreign Application Priority Data
Sep. 7, 2011    (GB) .................................. 1115472.1

(51) Int. Cl.
*B60B 7/01*    (2006.01)
*B60B 7/06*    (2006.01)

(52) U.S. Cl.
CPC .............. *B60B 7/01* (2013.01); *B60B 7/065* (2013.01); *B60B 2310/321* (2013.01);
(Continued)

(58) Field of Classification Search
CPC .................................. B60B 7/01; B60B 7/065
(Continued)

(56) References Cited

U.S. PATENT DOCUMENTS 2,977,152 A * 3/1961 Lyon ......................... B60B 7/08
301/37.36
3,918,762 A * 11/1975 Hampshire ............... B60B 7/04
301/37.105
(Continued)

FOREIGN PATENT DOCUMENTS

DE    10 2010 026670 A1    3/2010
GB    395 150 A    7/1933
(Continued)

OTHER PUBLICATIONS

"Land Rover Confirms All-New Defender Concept for Frankfurt Motor Show," Jaguar Land Rover Media Centre, http://newsroom.jaguarlandrover.com/en-in/land-rover/?from=11#!/news/2011/08/lr_dc100_concept_310811/, Aug. 30, 2011.

*Primary Examiner* — Hau Phan
(74) *Attorney, Agent, or Firm* — Myers Bigel, P.A.

(57) ABSTRACT

The present invention relates to a wheel rim extender device (1) removably mountable on a wheel (3) having a tire retaining rim (27) for engaging an outer surface of a tire (5). The device (1) has an annular member (11) for location adjacent a sidewall (7) of a tire (5) mounted on the wheel (3). The annular member (11) comprises an edge portion (33a, 33b) which defines an outer circumference of the annular member (11) and a support portion (35a, 35b), disposed radially inward of the edge portion (33a, 33b), for mounting on the wheel (3), wherein the edge portion (33a, 33b) has a greater flexibility than the support portion (35a, 35b). The invention also relates to the combination of a wheel rim extender device (1) and a wheel (3).

15 Claims, 4 Drawing Sheets

(52) U.S. Cl.
CPC ... *B60B 2310/656* (2013.01); *B60B 2360/141* (2013.01); *B60B 2360/30* (2013.01); *B60B 2900/572* (2013.01); *B60Y 2200/11* (2013.01)

(58) Field of Classification Search
USPC .................. 301/37.23, 37.376, 67.106, 37.32
See application file for complete search history.

(56) References Cited

U.S. PATENT DOCUMENTS

| | | | |
|---|---|---|---|
| 5,636,906 A * | 6/1997 | Chase | B60B 1/08 301/37.11 |
| 6,200,411 B1 * | 3/2001 | Eikhoff | B60B 7/0046 301/37.43 |
| 6,346,159 B1 * | 2/2002 | Chase | B29C 44/1233 301/37.43 |
| 6,419,327 B1 * | 7/2002 | Renshaw | 301/37.376 |
| 6,575,537 B1 * | 6/2003 | Wang | 301/37.23 |
| 6,688,703 B1 * | 2/2004 | Wang | 301/37.23 |
| 6,712,432 B1 | 3/2004 | Cheng | |
| 6,752,469 B1 * | 6/2004 | Cutcher | B60B 7/18 301/37.11 |
| 6,860,568 B2 * | 3/2005 | Nunes | 301/37.23 |
| 8,147,004 B2 | 4/2012 | Milicevic et al. | |
| 8,276,992 B2 * | 10/2012 | Smith | 301/37.376 |
| 2010/0066155 A1 | 3/2010 | Seradarian et al. | |
| 2011/0291463 A1 | 12/2011 | Milicevic et al. | |

FOREIGN PATENT DOCUMENTS

| | | |
|---|---|---|
| GB | 511 056 A | 8/1939 |
| GB | 2 232 129 A | 12/1990 |
| GB | 2 398 765 A | 9/2004 |
| GB | 2 480 070 A | 11/2011 |
| WO | WO 00/24595 | 5/2000 |
| WO | WO 2009/153666 A1 | 12/2009 |

* cited by examiner

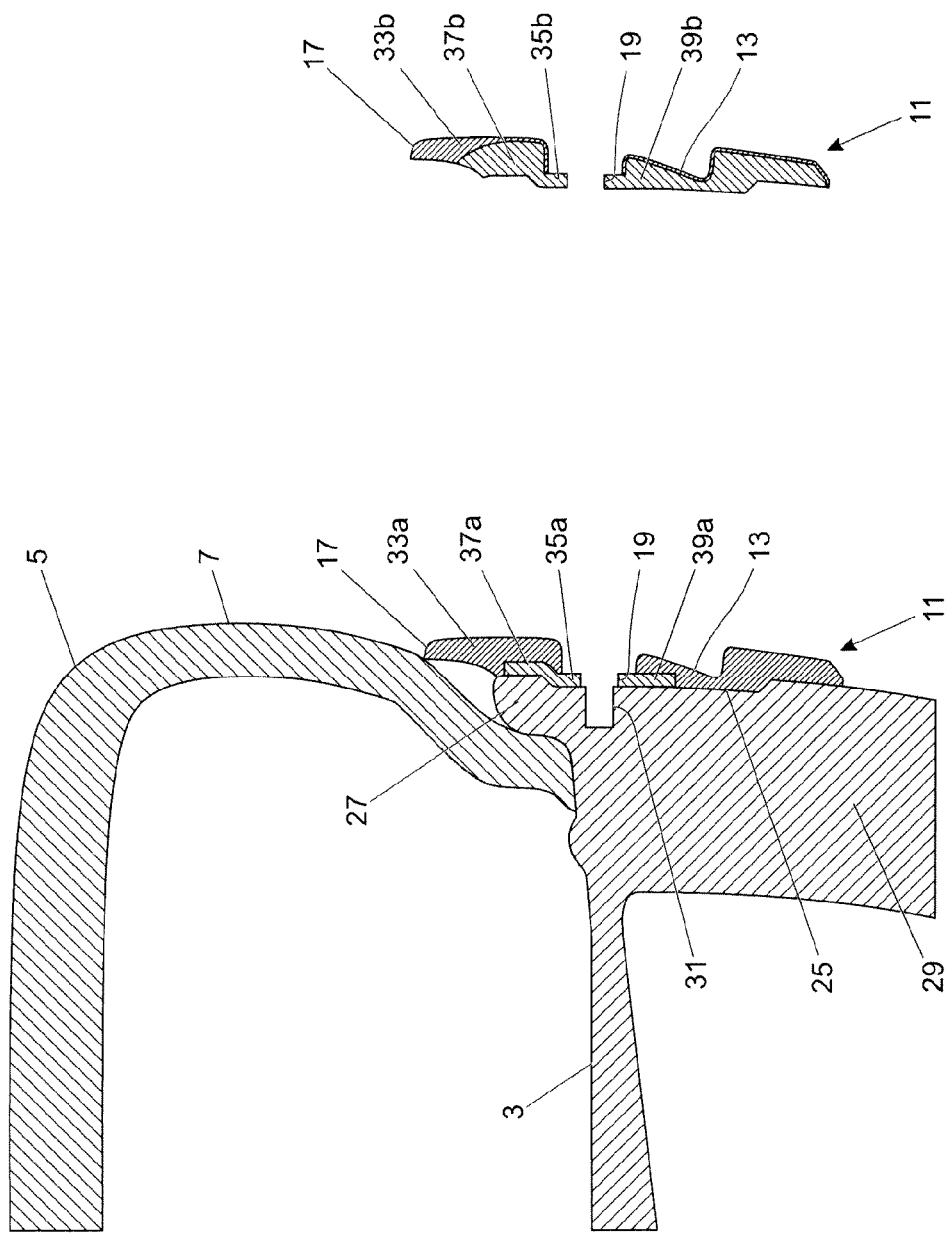

WHEELS

RELATED APPLICATIONS

This application is a 35 U.S.C. §371 national stage application of PCT Application No. PCT/EP2012/067542, filed on Sep. 7, 2012, which claims priority from Great Britain Patent Application No. 1115472.1, filed Sep. 7, 2011, the contents of which are incorporated herein by reference in their entireties. The above-referenced PCT International Application was published in the English language as International Publication No. WO 2013/034711A1 on Mar. 14, 2013.

TECHNICAL FIELD

The present invention relates to a rim extender for mounting on a vehicle wheel. The invention has particular application in relation to wheels for a motor vehicle. Aspects of the invention relate to a device, to an extender, to a wheel and to a vehicle.

BACKGROUND

Vehicle tyres are mounted on wheels that are bolted to a hub. A conventional vehicle tyre has a bead on each side to contact inner and outer rims on the wheel. The tyre locates inside the rims and the internal pressure of the tyre presses the bead firmly against the rim to secure the tyre on the wheel. The rim remains visible with the tyre in position so the diameter of the rim has an impact on the appearance of the vehicle. It is common to specify different diameter wheels to alter the vehicle's appearance. However, the handling characteristics of the vehicle may be affected by the diameter of the wheel in relation to that of the tyre. It would be desirable to be able to alter the appearance of the wheel without affecting vehicle performance.

To avoid the tyre being debeaded from a wheel, it is known to use a bead lock (also referred to as a rim lock) wheel to clamp the tyre bead in position. Rather than provide the wheel with a rim for contacting an exterior of the tyre, the wheel is provided with an inner ring which forms a first clamping surface against which an interior of the tyre locates. An annular outer ring forms a second clamping surface for positioning against an exterior of the tyre to clamp the tyre in position. The outer ring is sized to match the inner ring so as not to impede the performance of the tyre. The bead lock wheel is a structural component and there is a significant weight penalty.

The inventors have recognised that it would be desirable to be able to change the appearance of a wheel for a vehicle.

SUMMARY OF THE INVENTION

According to one aspect, the present invention provides a wheel rim extender device removably mountable on a wheel having a tyre retaining rim for engaging an outer surface of a tyre, the device comprising an annular member for location adjacent a sidewall of a tyre mounted on the wheel, wherein the annular member comprises an edge portion which defines an outer circumference of the annular member and a support portion, disposed radially inward of the edge portion, for mounting on the wheel, wherein the edge portion has a greater flexiblility than the support portion.

Thus, in use, the outer edge portion of the rim extender can flex so as accommodate any deflection of the side wall of the tyre. Accordingly, the rim extender will not damage the tyre or adversely affect the function of the tyre, for example the stiffness and/or compliance of the side-wall of the tyre.

In use, the rim extender can cover at least a portion of the wheel rim and at least a portion of a side-wall of a tyre fitted to that wheel. Thus, the rim extender functions as a decorative trim component and can create the appearance of a wheel having a larger diameter. For a given tyre diameter, the rim extender may facilitate a compromise between a smaller diameter of wheel (and a tyre having a larger aspect ratio) for ride and grip; and a larger diameter wheel (and a tyre having a comparatively lower aspect ratio) for aesthetics.

In use, an inside surface of the rim extender can be in contact with, or be biased against the sidewall of the tyre. However, the rim extender is not intended to lock the tyre bead to the rim (i.e. the rim extender does not function as a bead lock). Indeed, the rim extender can be spaced apart from said sidewall when installed on the wheel. As the rim extender is not intended to secure the tyre in position, it can have a lightweight construction.

The rim extender can protect the wheel from damage, for example resulting from contact with rocks or kerbstones.

The annular member may be of substantially planar form.

The annular member may be a unitary member.

The edge portion may be formed from a first material, and the support portion may be formed from a second material. The second material may be harder than the first material.

Conveniently, the edge portion and the support portion may be moulded from respective first and second plastics materials.

The edge portion may be formed by partially or completely over-moulding the support portion. The support portion may be formed from a metal or a plastics material.

Conveniently, the support portion may comprise one or more holes formed therethrough for receiving fastening means for mounting the device to the wheel. The support portion may comprise one or more radially inwardly projecting flanges, wherein each of said one or more holes is formed in a respective one of said one or more flanges. The fastening means may comprise one or more mechanical fasteners, such as a spring clip or a threaded fastener. The rim extender may comprise mounting means for mounting the rim extender on the wheel, the mounting means comprising co-operating features for mating with the wheel to mount the rim extender.

A central aperture can be provided in the rim extender. The central aperture can provide access to the wheel mounting bolt(s) to allow the wheel to be removed/changed with the rim extender installed. Providing a central aperture can also allow airflow through the wheel to be maintained in use, for example to assist with cooling the friction braking system.

A cavity or recess can be formed between the rim extender and the wheel and/or tyre to accommodate one or more wheel balance weights. For example, an annular channel could be formed in the rim extender to receive said one or more wheel balancing weights. The use of "clip-on" type wheel balance weights may be considered unsightly. The rim extender according to an embodiment of the present invention can cover rim-mounted balancing weights (if fitted) and obscure them from view. The rim extender may also help to secure the wheel balance weights on the rim.

The annular member has a first surface for facing the tyre and a second surface for facing outwardly. The first surface can be different from the second surface. The second surface can be harder than the first surface. A resilient layer or coating can be applied to the annular member to form the first surface. For example, a soft polyurethane or silicone rubber layer can be applied to the annular member.

At least one protuberance can be provided on the rim extender for aligning the rim extender with the wheel. For example, the at least one protuberance can locate in a recess provided in the wheel. Alternatively, or in addition, at least one recess can be provided in the rim extender to receive a cooperating protuberance formed on the wheel. The protuberance(s) can, for example, extend out of the plane of the rim extender. The rim extender could have one or more flanges for cooperating with the rim of the wheel.

A locking mechanism could be provided to lock the rim extender to the wheel.

According to a further aspect of the invention there is provided a wheel adapted to receive a rim extender as described herein.

According to a still further aspect of the invention there is provided a rim extender described herein in combination with a wheel having a tyre retaining rim. The rim extender may have an outside diameter which is larger than a diameter of the tyre retaining rim. The rim extender can have a diameter which is at least 0.125" (3 mm), 0.25" (6 mm), 0.375" (9 mm), 0.5" (12 mm), 0.75" (18 mm) or 1" (25 mm) larger than the diameter of the tyre retaining rim. The rim extender can be mounted on the wheel by a plurality of fasteners.

It will be appreciated that the configuration of the rim extender can be altered to suit different diameters of wheels. For example, the diameter and/or the width of the annular member can be increased or decreased. Similarly, the number and/or position of the support members for mounting the rim extender on the wheel can be changed.

Within the scope of this application it is envisaged that the various aspects, embodiments, examples, features and alternatives set out in the preceding paragraphs, in the claims and/or in the following description and drawings may be taken independently or in any combination thereof. For example, features described with reference to one embodiment are applicable to all embodiments, except where there is incompatibility of features.

BRIEF DESCRIPTION OF THE DRAWINGS

Embodiments of the present invention will now be described, by way of example only, with reference to the accompanying figures, in which:

FIG. 4A and 4B are respective cross-sectional views of alternative constructions of the device shown in FIG. 1 as viewed along the line A-A in FIG. 2A.

DETAILED DESCRIPTION

Figure 1:
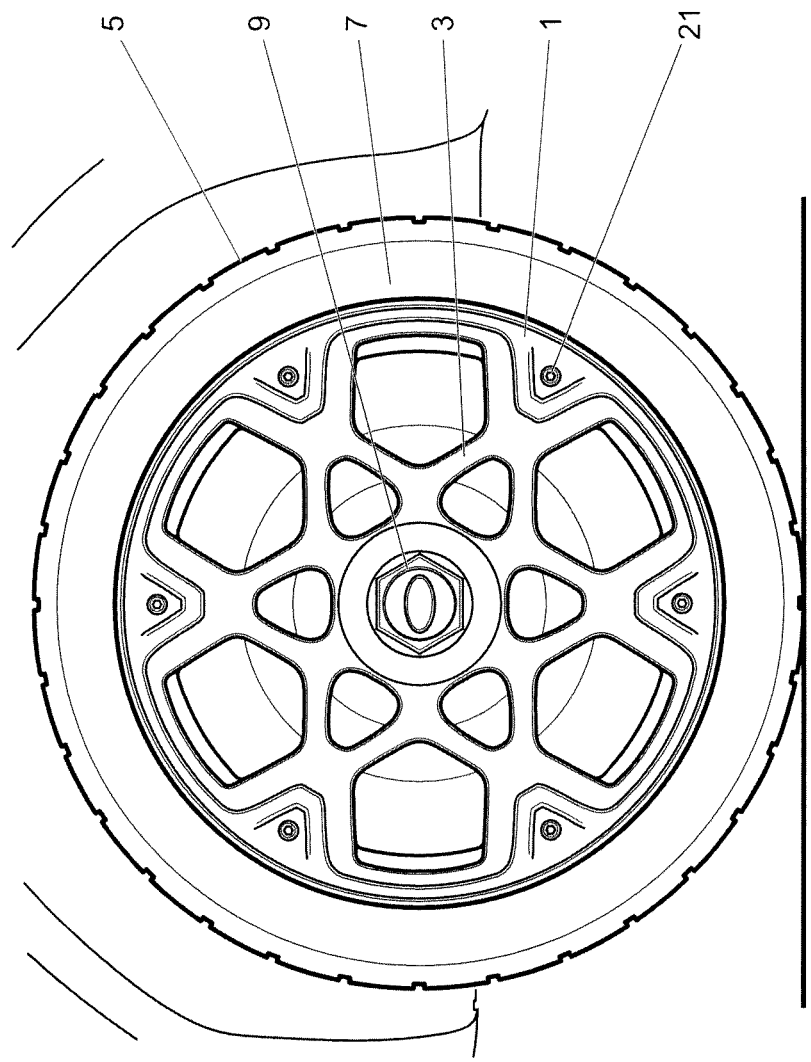
FIG. 1 shows a rim extender device according to an embodiment of the present invention mounted on a wheel.

A rim extender 1 according to an embodiment of the present invention is illustrated in FIG. 1. The rim extender 1 is illustrated mounted on a wheel 3. A tyre 5 having a sidewall 7 and a locating bead (not shown) is fitted to the wheel 3 in conventional manner. The wheel 3 is mounted on a hub of a motor vehicle (not shown) by a wheel fastener 9.

In use, a first surface S1 of the rim extender 1 faces the sidewall 7 of the tyre 5 and a second surface S2 faces away from the sidewall 7. The rim extender 1 extends radially outwardly beyond an outer edge of the wheel 3 so as to cover a portion of the sidewall 7 of the tyre 5. The rim extender 1 thereby creates the visual impression of increasing the diameter of the wheel 3 and reducing the aspect ratio of the tyre 5.

Figure 2C:
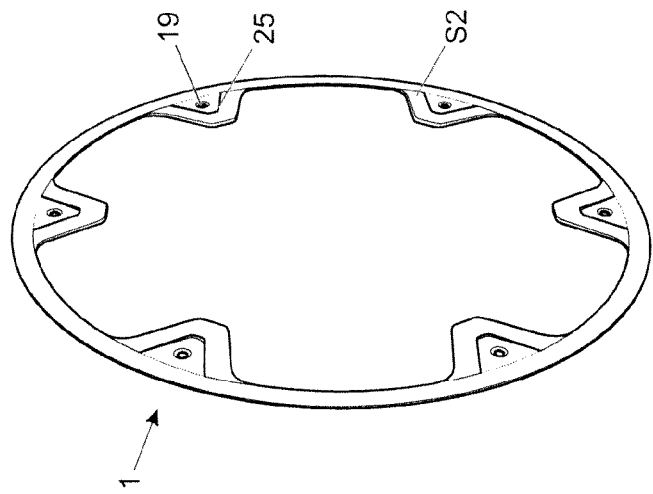
FIGS. 2A, 2B and 2C are, respectively, plan, side and perspective views of the rim extender device shown in FIG. 1.
Figure 2B:
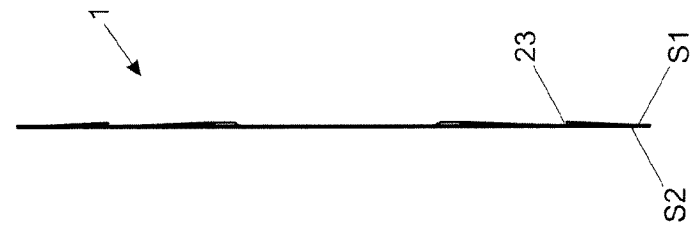
Figure 2A:
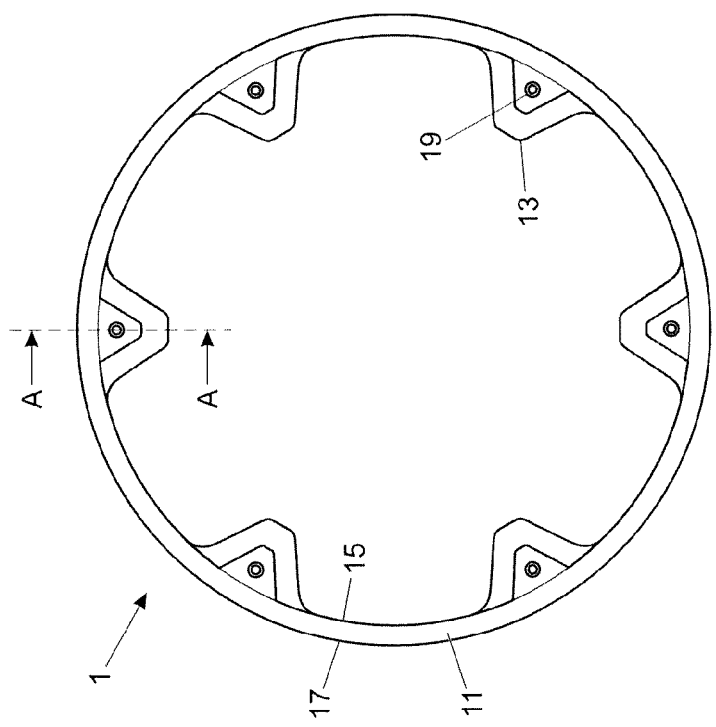

As best illustrated in the plan elevation shown in FIG. 2A, the rim extender 1 comprises an annular member 11 and six support members 13. The support members 13 are disposed around an inner edge 15 of the annular member 11 and extend radially inwardly. An outer edge 17 of the annular member 11 is circular to replicate the profile of a standard wheel rim. The support members 13 are generally triangular in shape and each have a circular aperture 19 for receiving fastening means, such as a threaded bolt 21 (shown in FIG. 1), to mount the rim extender 1 removably on the wheel 3.

As illustrated in the side elevation shown in FIG. 2B, the rim extender 1 is generally planar. However, a protuberance 23 is provided on the first surface S1 of each support member 13 to locate in a detent 25 (shown in FIG. 3) formed in the wheel 3. The protuberances 23 align the rim extender 1 when it is first positioned on the wheel 3 ready for introduction of the fasteners 21. A recess 25 is formed in the second surface S2 corresponding to the protuberance 23, as shown in the perspective view of FIG. 2C.

Figure 3:
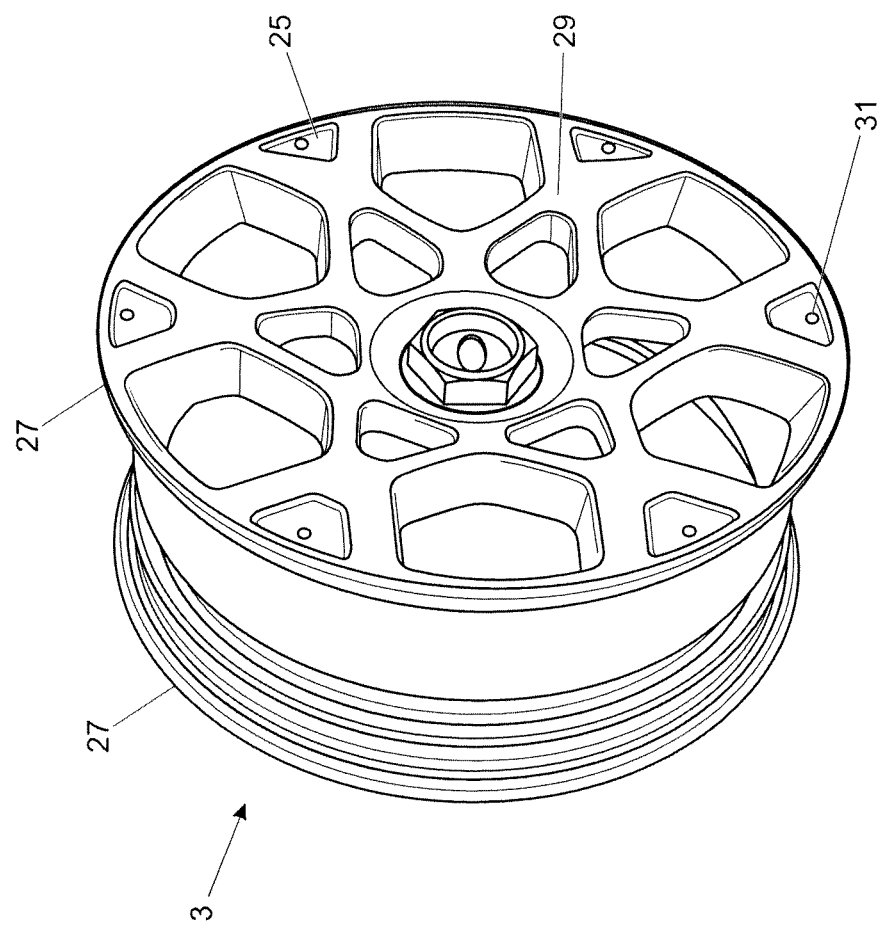
FIG. 3 is a perspective view of a wheel for mounting the rim extender device shown in FIG. 1.

A perspective view of the wheel 3 is shown in FIG. 3. The wheel 3 is of conventional construction and has a pair of opposing tyre retaining rims 27 for engaging the tyre bead. The tyre retaining rims 27 are formed integrally with the wheel 3. In use, the outer surfaces of the tyre beads are pressed against the inside of the tyre retaining rims 27 by internal tyre pressure to secure the tyre 5 in position. The wheel 3 in the present embodiment comprises six radial spokes 29. A threaded aperture 31 is provided in each spoke 29 proximal the tyre retaining rims 27 to receive the bolts 21. Reinforcing threaded inserts may be provided to receive the bolts 21.

The rim extender 1 has a diameter which is approximately 1" (25 mm) larger than the diameter of the tyre retaining rim 27. The first surface S1 of the rim extender 1 sits against the sidewall 7 of the tyre 5. However, the rim extender 1 does not secure the tyre 5 in position. Rather, the rim extender 1 provides a non-structural, trim component.

The rim extender 1 may be deformed by the tyre 5, for example due to deflection of the tyre 5 under operating loads. To accommodate this movement, the rim extender 1 is made of a resilient material, such as metal or a resilient plastics material.

To prevent damage to the tyre 5, at least the first surface S1 of the annular member 11 can be provided with a flexible or resilient coating. The coating can be soft polyurethane or silicone rubber applied using an over-moulding technique.

Rather than over-mould the coating onto the rim extender 1, a dual-shot plastics moulding process could be used to form the rim extender 1. Two plastics materials having different hardness properties could be used to provide the desired characteristics of the rim extender 1.

A reinforcing insert may optionally be provided in each support member 13 to prevent damage when the fasteners 21 are tightened. The insert could be made of metal or a hard plastics material.

The rim extender 1 is fitted by placing it against the wheel 3 and locating the protuberances 23 within the detents 25. The bolts 21 can then be inserted through the apertures 19 in the rim extender 1 and screwed into the threaded apertures 29 in the wheel 3. The rim extender 1 projects radially outwardly beyond the tyre retaining rim 27 and can be fitted with the tyre 5 positioned on the wheel 3. The first surface S1 of the rim extender 1 abuts the side wall 7 of the tyre 5. As the rim extender 1 does not obstruct the wheel fastener 9, the wheel 3 can be fitted to, or removed from the vehicle with the rim extender 1 in place.

In more detail, referring to FIG. 4A, in the case that the rim extender 1 is constructed using a dual-shot moulding process, the annular member 11 comprises an edge portion 33a and a support portion 35a. The edge portion 33a comprises an outer annular region of the annular member 11 which terminates at and defines the outer circumferential edge 17 of the annular member 11. The support portion 35a is of substantially annular form and comprises an annular part 37a which has a plurality of radially inward projecting flanges 39a, each of which corresponds to one of the six support members 13.

As shown in FIG. 4A, when mounted on the wheel 3, the annular part 37a of the support portion 35a is disposed adjacent to the tyre retaining rim 27 of the wheel 3, and each flange 39a is received within a detent 25 formed in each spoke 29 of the wheel 3. The apertures 19 for receiving the threaded bolts 21 are provided in the respective flanges 39a of the support portion 35a, co-axial with each threaded aperture 31 in the wheel 3.

The edge portion 33a and the support portion 35a are formed from first and second plastics materials by means of a dual-shot moulding process. The first plastics material, which forms the edge portion 33a and, in the case of the embodiment shown in FIG. 4A, defines the overall shape of the annular member 11, is formed from a plastics material which is selected such that the edge portion 33a is flexible relative to the support portion 35a. For example, in the presently described embodiment this can be achieved by the second plastics material which forms the support portion 35a being harder than the first plastics material.

With the above construction, the support portion 35a forms a rigid core of the annular member 11 which can be securely attached to the wheel 3 by means of inserting a threaded bolt 21 through each aperture 19 of each flange 39a and screwing it into the corresponding threaded apertures 31 in the spokes 29 of the wheel 3. Furthermore, because the flanges 39a of the support portion 35a are all joined together by means of the annular part 37a of the support portion 35a, this ensures that the annular member 11 does not become distorted during use. At the same time, the edge portion 33a is sufficiently flexible such that any deflection of the adjacent side wall of the tyre 5 during use can be accommodated without causing damage to the tyre 5.

Referring to FIG. 4B, the annular member 11 may also be formed using an over-moulding process, and comprises an edge portion 33b and a support portion 35b. In this case, the second material which forms the support portion 35b may be, for example, a metal or a plastics material. As shown in FIG. 4B, the support portion 35b comprises an annular part 37b at its outer periphery and has a plurality of inwardly projecting flanges 39b. In this embodiment, each flange 39b defines the overall shape of each respective support member 13. The edge portion 33b is formed by over-moulding a first material, such as a soft polyurethane or silicone rubber, on the outer surface of the support portion 35b. As before, the flexibility of the first material is selected such that the edge portion 33b can flex in response to deflection of the side wall of the tyre 7 during use.

With the constructions of FIGS. 4A and 4B, only the first material, which forms the edge portion 33a, 33b, is visible to a user when the annular member 11 is mounted on the wheel 3, which helps to provide a pleasing aesthetic appearance.

The rim extender 1 can be fitted over clip-on wheel balance weights thereby hiding them from view and helping to ensure that they do not become dislodged from the wheel 3. Moreover, the rim extender 1 can help to protect the wheel 3 from damage, for example from rocks and kerbstones. If damaged, the rim extender 1 could be replaced without the need to replace the wheel 3. Also, the rim extender 1 can be replaced without removing either the tyre 5 or the wheel 3.

As the rim extender 1 is not structural, it can have a lightweight construction to reduce the impact on vehicle performance. The rim extender 1 is resilient so as not to affect the function of the tyre 5, for example the stiffness or compliance of the side-wall 7 of the tyre 5. The flexing of the rim extender 1 in use can also accommodate tyre deflections in use. Thus, in use, the ride quality and steering feel of the vehicle is not adversely affected when the rim extender 1 according to the present invention is fitted.

It will be appreciated that various changes can be made to the rim extender described herein without departing from the spirit and scope of the present invention. In the present embodiment, the rim extender 1 and wheel 3 are configured to look like a bead lock wheel. However, the surface finish, profile and design of the rim extender 1 and the wheel 3 can readily be changed.

The invention claimed is:

1. A wheel rim extender device removably mountable on a wheel having a tyre retaining rim for engaging an outer surface of a tyre, the device comprising:
   an annular member configured to be mounted to the wheel for location adjacent a sidewall of the tyre mounted on the wheel,
   wherein the annular member comprises an edge portion which defines an outer circumference of the annular member, a support portion disposed radially inward of the edge portion, and a central aperture,
   wherein, when the annular member is mounted to the wheel, the edge portion extends radially outwardly beyond an outer edge of the wheel so as to cover a portion of the tyre sidewall, and the central aperture provides access to wheel mounting bolts to allow the wheel to be removed with the rim extender mounted to the wheel, and
   wherein the edge portion has a greater flexibility than the support portion and is formed by partially or completely over-moulding the support portion.

2. A device according to claim 1, wherein the annular member is of substantially planar form.

3. A device according to claim 1, wherein said annular member is a unitary member.

4. A device according to claim 1, wherein the edge portion is formed from a first material, and the support portion is formed from a second material.

5. A device according to claim 4, wherein the second material is harder than the first material.

6. A device according to claim 4, wherein the edge portion and the support portion are moulded from respective first and second plastics materials.

7. A device according to claim 1, wherein the support portion is formed from a metal or a plastics material.

8. A device according to claim 1, wherein the support portion comprises one or more holes formed therethrough for receiving fastening means for mounting the device to the wheel.

9. A device according to claim 8, wherein the support portion comprises one or more radially inwardly projecting flanges, wherein each of said one or more holes is formed in a respective one of said one or more flanges.

10. A device according to claim 1, wherein, in use, a cavity is formed between the device and the wheel and/or tyre to accommodate one or more wheel balancing weights.

11. A device according to claim 1, wherein the annular member has a first surface for facing the tyre and a second surface for facing outwardly, the second surface being harder than the first surface.

12. A device according to claim 11, wherein a resilient layer or coating is applied to the annular member to form said first surface.

13. A device according to claim 1, wherein the device comprises at least one protuberance locatable in a cooperating recess formed in the wheel to locate the device.

14. A device as claimed in claim 1 in combination with a wheel having a tyre retaining rim, wherein the device has a diameter which is larger than a diameter of the tyre retaining rim.

15. A wheel adapted to receive a wheel rim extender device, wherein the wheel rim extender device comprises an annular member having an edge portion which defines an outer circumference of the annular member, a support portion disposed radially inward of the edge portion, and a central aperture, wherein, when the annular member is mounted to the wheel, the edge portion extends radially outwardly beyond an outer edge of the wheel so as to cover a portion of a sidewall of a tyre mounted on the wheel, and the central aperture provides access to wheel mounting bolts to allow the wheel to be removed with the rim extender mounted to the wheel, and wherein the edge portion has a greater flexibility than the support portion and is formed by partially or completely over-moulding the support portion.

* * * * *